Patented Apr. 2, 1929.

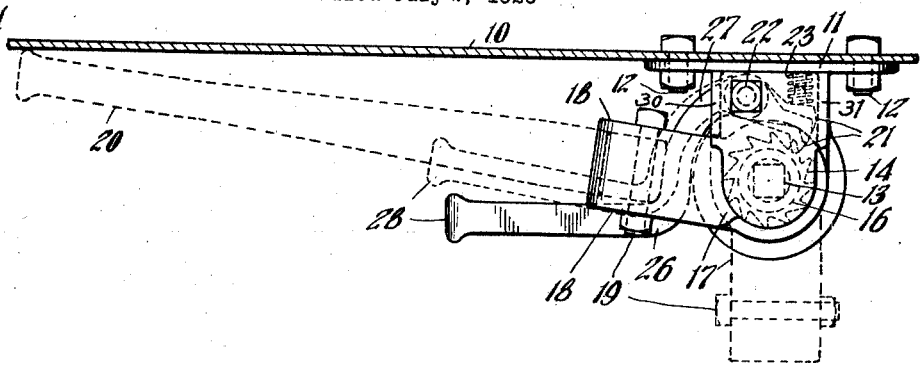
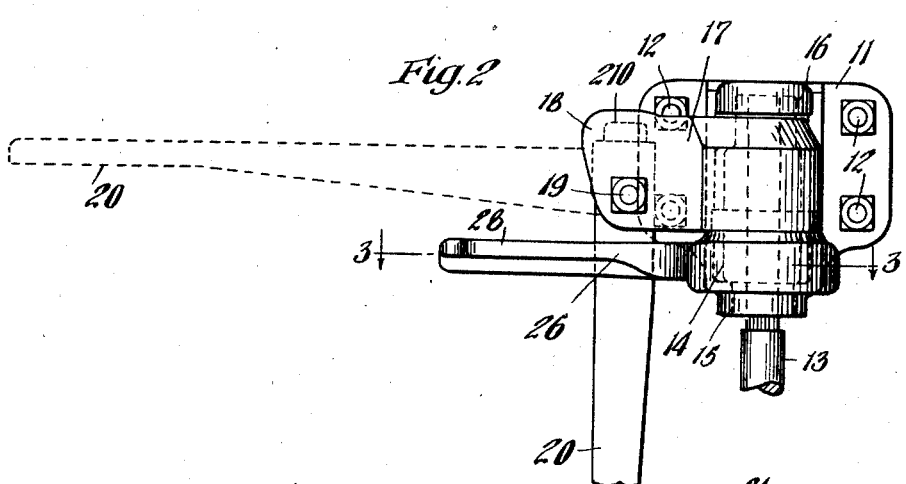
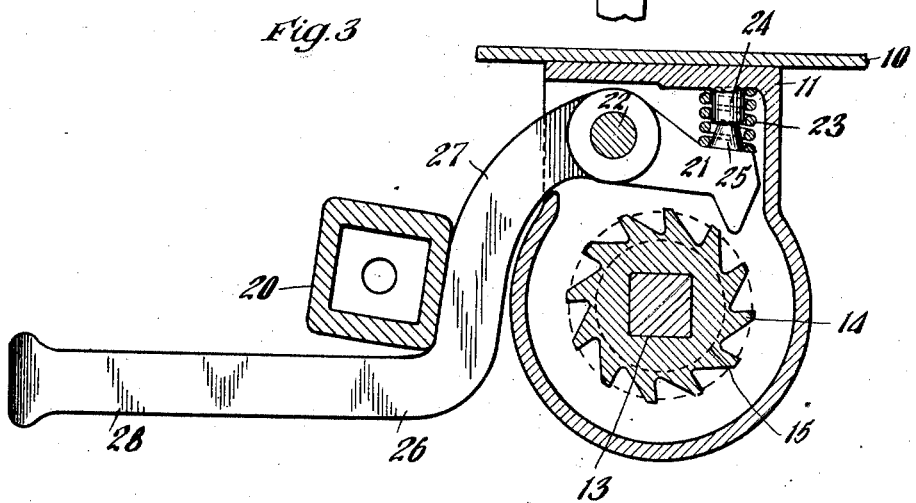

1,707,357

UNITED STATES PATENT OFFICE.

GOODRICH Q. LEWIS, OF WHEATON, ILLINOIS, ASSIGNOR TO W. H. MINER, INC., OF CHICAGO, ILLINOIS, A CORPORATION OF DELAWARE.

HAND BRAKE.

Application filed July 2, 1926. Serial No. 120,004.

This invention relates to hand brakes.

In the operation of hand brakes of the vertical staff type in which means are provided for rotating the staff to wind the brake chain thereon, ratchet mechanism is also provided for preventing accidental reverse rotation of the staff, and when it is desired to release the brakes, the release lever of the ratchet mechanism must be disconnected and held out of engagement until the brake chain has unwound sufficiently to release the brake shoes, and immediately the lever is released the same resumes its normally engaged position with the ratchet associated with the staff, thereby preventing any further reverse rotation of the staff. Due to various reasons the release ratchet is frequently permitted to resume its engaged position with the brake staff before the same has unwound sufficiently to fully release the brake shoes, thereby resulting in incomplete unwinding of the brake chain from the staff and dragging of the brake shoes upon the wheels with consequent great wear upon the parts and increased tractive effort by the locomotive.

The purpose of the present invention is to provide means for locking the release lever in disengaged position to permit full unwinding movement of the brake staff, said means being of a character whereby the actuating mechanism including the swingable operating handle for rotating the staff to take up the brake chain, is utilized in one position of the parts to be placed in the path of the release lever when the same is moved to inoperative position to prevent said lever from resuming its normal operative position the arrangement also serving to secure the operating handle and the actuating mechanism which carries it, against undesirable vibration.

Another object of the invention is to arrange the parts of the brake in such manner that there is no danger of accidental release thereof when the operating handle is dropped to disengage the actuating mechanism from the staff, the release lever when in its holding position being so disposed as to prevent unintentional displacement by the operating handle, but permitting the operating handle to be arranged in the path of the release lever after the same has been manually pulled in a releasing direction to prevent its return to operative position.

Other and further objects of the invention will more clearly appear from the description and claims hereinafter following.

In the drawing forming a part of this specification, Fig. 1 is a horizontal sectional view through the end wall of a car, showing a top plan of the hand brake mechanism with my improvements incorporated therein, the operating handle of said brake mechanism being shown in position to hold the release lever out of engagement, and the operating handle and release lever being shown in dotted lines as they appear prior to movement of the release lever to permit the operating handle to assume its position in the path of the release lever. Fig. 2 is a front elevational view, showing the operating handle in full lines, in position to hold the release lever disengaged, said handle being shown in dotted lines prior to movement to the position of said lever shown in full lines. And Fig. 3 is a transverse, horizontal, sectional view of the invention, substantially on the line 3—3 of Fig. 2, and showing parts of the mechanism in plan.

Referring to the drawing, the end wall of the car is indicated at 10, to which is secured a housing or bearing bracket designated generally by the reference character 11 and having spaced side walls 30 and 31. The housing 11 is secured to the wall 10 by suitable bolts 12—12, and projecting into the housing is the usual vertical brake staff, a portion of which is indicated at 13, the staff having a square or other noncircular cross section at the top thereof, on which is rigidly fitted a ratchet wheel 14. The ratchet wheel is suitably mounted in the housing for rotation by journals indicated at 15 and 16. Oscillatably mounted upon the bearing bracket 11 is a carrier or fulcrum member designated generally by the reference character 17. The carrier 17 is provided with laterally extending wings 18, and pivotally mounted between the wings 18 by the horizontally disposed bolt 19 is an operating handle or arm 20. As shown in Figure 1, the end edge of the wall 30 acts as a limiting stop for the carrier 17 by engagement with the wings 18 thereof. The handle 20 is provided at the inner end thereof with a socket in which is slidably mounted a pawl 210 normally impelled outwardly by means of a spring not shown. The arrangement of the handle and pawl is such that when the handle is elevated to a horizontal position, as shown in dotted lines in Fig. 2, the pawl is operatively engaged with the ratchet wheel 14, so that oscillation of the handle 20 imparts rotation to the staff 13 in a direction to take up the brake chain, and when the handle 20 is released, it automatically falls of its own weight to a depending vertically arranged inoperative position. All of the above described mechanism is old and well known as for instance in U. S. Patent to Brown No. 1,185,972, June 6, 1916, and Geiger No. 1,575,752, March 9th, 1926, and no claim is made thereto, except in combination with the novel means for utilizing the operating handle to cooperate in effecting full unwinding of the brake staff, which means will be now referred to.

To hold the staff 13 against retrograde rotation, a locking dog 21 is provided, which is pivotally mounted upon a bolt 22 in the housing 11, said dog being adapted to normally engage the ratchet wheel 14 under the influence of a coiled spring 23, one end of which is disposed about the lug 24 formed on the inner wall of the housing, and the opposite end of which is disposed about a lug 25 formed on the end of the dog 21.

Forming part of the dog 21 is a release lever 26, said lever including a curved offset portion 27 which extends outwardly from the wall 10 a suitable distance as shown in Figs. 1 and 3, the lever 26 being provided with a handle portion 28 which extends substantially parallel with the dog 21, so that by reason of the offset portion 27, the handle portion 28 is spaced outwardly from the wall 10 a considerably greater distance than is customary in brakes of the character now existing. The offset portion of the release lever is of such extent that when the dog 21 is in engagement with the ratchet 14, the operating handle 20 when it is dropped strikes upon the upper surface of the release lever without moving the same to disengage the dog 21 thereby preventing unintentional release of the dog 21, and the release lever is so formed that when the same is manually pulled away from the wall 10 to release the ratchet 14, the operating handle 20 may then be dropped or placed behind the release lever and so lock the same against movement toward engagement with the ratchet wheel inward movement of the handle toward the car wall being limited by engagement of the carrier 17 with the free edge of the wall 30 of the housing, the operating handle being thus held against vibration.

In operation, assuming the parts of the mechanism to be in the position shown in Figs. 1 and 2, and it is desired to tighten the brakes, the operating handle 20 is first elevated to the position shown in dotted lines in Fig. 2, thereby permitting the dog 21 to assume its normal engagement with the ratchet wheel 14 under the influence of the spring 25. Elevation of the operating handle 20 causes engagement of the pawl 210 with the ratchet wheel 14, and oscillation of said operating handle 20 effects clockwise rotation of the ratchet wheel 14 and staff 13 so as to wind the brake chain upon the staff. In this position of the parts, the operating handle may be dropped at any point within its movement, and will have no effect in releasing the dog 21; for instance, if the handle 20 were to be in the position shown in dotted lines in Fig. 1 when the same is dropped, said handle would come into engagement with the top surface of the handle portion 28 of the release lever 26, thereby preventing accidental release of the dog 21. On the other hand when it is desired to release the brake to permit unwinding of the staff, the handle portion 28 of the release lever 26 may be manually pulled away from the wall 10 to release the dog 21, and the operating handle 20 then has sufficient clearance to drop behind the release lever 26 so as to lock said lever in released position and maintain the dog 21 out of engagement to permit unimpeded unwinding of the brake chain from the staff, and it should be observed that when the operating handle 20 is in position behind the release lever, movement of the handle toward the car wall is prevented by the housing wall 30, that the operating handle 20 and the carrier 17 are restrained from free oscillation about the axis of the carrier, so that the operating handle, release lever, and carrier are so interlocked as to effect a desirable condition with respect to these parts, which permits full unwinding of the brake chain from the staff without interference with the normal operation of the brake.

While I have herein shown and described what I now consider the preferred manner of carrying out the invention, the same is merely illustrative, and I contemplate all changes and modifications that come within the scope of the claims appended hereto.

I claim:

1. In a hand brake, the combination with a tightening element; of a mechanism for rotating said tightening element, said mechanism including an operating member movable to position to engage and disengage said mechanism; and means engageable with said tightening element holding same against retrograde movement, said holding means having elements adapted to be engaged by said operating member when in released position to lock the holding means against return movement to operative position after being disengaged from said tightening element, said holding means when in operatively engaged with the tightening element preventing said operating member from assuming locking position until said holding means is moved out of engagement with the tightening element.

2. In a hand brake, the combination with an element adapted to be rotated to effect tightening of the brake rigging; of a carrier adapted to oscillate about the axis of said tightening element; an operating member movable with reference to said carrier; and holding means engageable with said element to prevent retrograde rotation thereof, said operating member and said holding means being adapted to be inter-engaged when said holding means is disengaged from said tightening element to lock said holding means in said disengaged position and to restrain said operating member and said carrier against oscillation.

3. A hand brake, the combination with a brake staff adapted to be rotated to effect tightening of a brake chain; of a ratchet wheel rotatable with said member; a carrying member adapted to oscillate about the axis of said staff; a locking dog pivotally mounted upon an axis arranged substantially parallel to the axis of said staff, said locking dog being provided with an offset handle portion by which the same may be moved in a releasing direction, said dog being normally urged into operative engagement with said ratchet wheel; and an operating member mounted upon said carrier to swing about an axis disposed at an angle to the axis of said staff, said operating member and said release lever being constructed to be interlocked in predetermined position.

4. In a hand brake, the combination with a rotatable brake winding member; of a toothed element carried by said member; an oscillatable member; a drop handle pivotally carried by said oscillatable member and having ratchet means adapted to engage said toothed member when elevated, and to be disengaged when lowered; and a pivotally mounted dog normally urged into engagement with said toothed member to prevent retrograde rotation thereof, said dog being provided with an offset handle portion, arranged to be inter-engaged with said operating member to lock said dog in inoperative position.

5. In a hand brake, the combination with a tightening element; of mechanism for rotating said tightening element, said mechanism including an operating member movable to position to engage and disengage said mechanism; and holding means arranged normally to prevent retrograde rotation of said element, said means and said operating member being arranged whereby the handle portion of said operating member may be interposed in the path of said holding means to maintain the same in released position.

6. In a hand brake, the combination with a brake staff; of mechanism for rotating said brake staff, said mechanism including an operating member movable to position to engage and disengage said mechanism; and holding means arranged normally to prevent retrograde rotation of said staff, said operating member and said holding means being adapted to be interengaged to lock said holding element out of operative position and to restrain said operating member from vibration.

7. In a hand brake, the combination with a staff adapted to be rotated to effect tightening of the brake rigging; of a carrier adapted to oscillate about the axis of said tightening element; an operating member pivotally mounted on said carrier on an axis at an angle to the axis of said staff; and a releasing dog pivotally mounted upon an axis substantially parallel with the axis of said staff, said dog being normally urged to operative position, and having a handle by which said dog may be released, said operating member and the handle of said dog being so constructed as to permit the same to be interengaged to maintain said holding dog out of operative position.

8. An article of manufacture comprising a dog having an engaging portion, a handle, means by which the same may be pivotally mounted, said handle portion being offset with respect to said engaging portion and extending in generally parallel directions.

In witness that I claim the foregoing I have hereunto subscribed my name this 30th day of June, 1926.

GOODRICH Q. LEWIS.